US012786996B2

(12) United States Patent
Guo et al.

(10) Patent No.: US 12,786,996 B2
(45) Date of Patent: Nov. 3, 2026

(54) POWER CONTROL SCHEMES FOR SIMULTANEOUS UPLINK TRANSMISSIONS

(71) Applicant: ZTE Corporation, Shenzhen (CN)

(72) Inventors: Xiaolong Guo, Shenzhen (CN); Bo Gao, Shenzhen (CN); Yang Zhang, Shenzhen (CN); Ke Yao, Shenzhen (CN); Shujuan Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 281 days.

(21) Appl. No.: 18/607,229

(22) Filed: Mar. 15, 2024

(65) Prior Publication Data

US 2024/0224273 A1 Jul. 4, 2024

Related U.S. Application Data

(63) Continuation of application No. PCT/CN2022/106828, filed on Jul. 20, 2022.

(51) Int. Cl.
*H04W 72/1268* (2023.01)
*H04W 52/14* (2009.01)
(Continued)

(52) U.S. Cl.
CPC ..... *H04W 72/1268* (2013.01); *H04W 52/146* (2013.01); *H04W 52/367* (2013.01);
(Continued)

(58) Field of Classification Search
CPC . H04W 72/1268; H04W 72/51; H04W 72/21; H04W 52/146; H04W 52/367; H04W 72/0446
See application file for complete search history.

(56) References Cited

U.S. PATENT DOCUMENTS

| | | | | |
|---|---|---|---|---|
| 10,574,416 | B2 * | 2/2020 | Ahn .................... | H04L 27/2601 |
| 10,736,046 | B2 | 8/2020 | MolavianJazi et al. | |

(Continued)

FOREIGN PATENT DOCUMENTS

| | | | |
|---|---|---|---|
| CN | 110167173 | A | 8/2019 |
| CN | 111800240 | A | 10/2020 |
| CN | 111955033 | A | 11/2020 |
| WO | 2022/011555 | A1 | 1/2022 |
| WO | 2022/079903 | A1 | 4/2022 |

OTHER PUBLICATIONS

JPO, Office Action for Japanese Application No. 2025-501816, mailed on Sep. 17, 2025, 7 pages with unofficial English translation.

(Continued)

*Primary Examiner* — Zaihan Jiang
(74) *Attorney, Agent, or Firm* — Ashurst Perkins Coie US LLP

(57) ABSTRACT

A method of wireless communication is described. The method includes, receiving, by a user device scheduled to simultaneously transmit uplink transmissions which are fully or partially overlapped in a time domain and associated with respective transmission information, a message indicating one or more sets of power control parameters associated with at least one transmission information from a network, and determining, based on the message, transmission power of at least one of the uplink transmissions.

16 Claims, 11 Drawing Sheets

(51) Int. Cl.
*H04W 52/36* (2009.01)
*H04W 72/0446* (2023.01)
*H04W 72/21* (2023.01)
*H04W 72/51* (2023.01)

(52) U.S. Cl.
CPC ....... *H04W 72/0446* (2013.01); *H04W 72/21* (2023.01); *H04W 72/51* (2023.01)

(56) References Cited

U.S. PATENT DOCUMENTS

| | | | | |
|---|---|---|---|---|
| 10,993,192 | B2 * | 4/2021 | Lin | H04W 52/42 |
| 12,426,080 | B2 * | 9/2025 | Ganesan | H04W 72/02 |
| 2016/0255593 | A1 | 9/2016 | Blankenship et al. | |
| 2018/0077651 | A1 | 3/2018 | Nory et al. | |
| 2018/0176938 | A1 | 6/2018 | Shao | |
| 2019/0215781 | A1 * | 7/2019 | Jeon | H04W 52/241 |
| 2020/0329832 | A1 * | 10/2020 | Wang | A44C 5/0069 |
| 2021/0007122 | A1 * | 1/2021 | Takeda | H04L 5/001 |
| 2021/0282150 | A1 * | 9/2021 | Mukkera | H04L 5/0094 |
| 2022/0022210 | A1 * | 1/2022 | Park | H04W 72/566 |
| 2022/0141775 | A1 | 5/2022 | Lu et al. | |
| 2023/0032247 | A1 * | 2/2023 | Vintola | H04W 52/346 |
| 2023/0058165 | A1 * | 2/2023 | MolavianJazi | H04W 52/08 |
| 2023/0100655 | A1 * | 3/2023 | Takeda | H04W 52/146 370/522 |
| 2023/0199672 | A1 * | 6/2023 | Takeda | H04W 52/146 455/323 |
| 2023/0300756 | A1 * | 9/2023 | Khoshnevisan | H04L 5/0035 455/522 |

OTHER PUBLICATIONS

EPO, Extended European Search Report for European Application No. 22 951 501.0, mailed on Jun. 12, 2025, 9 pages.

CATT, "On unified TCI framework extension for multi-TRP operation," 3GPP TSG RAN WG1 #109-e, e-Meeting, R1-2203441, May 9-20, 2022, 10 pages.

CMCC, "Discussion on UL precoding indication for multi-panel transmission," 3GPP TSG RAN WG1 #109-e, e-Meeting, R1-2204292, May 9-20, 2022, 3 pages.

Moderator (Ericsson), "Moderator Summary #1 on Two TA enhancements for multi-DCI based multi-TRP operation," 3GPP TSG RAN WG1 #109-e, e-Meeting, R1-2205209, May 9-20, 2022, 3 pages.

Nokia et al., "Unified TCI framework extension for multi-TRP," 3GPP TSG RAN WG1 #109, e-Meeting, R1-2204538, May 9-20, 2022, 23 pages.

NTT DOCOMO, Inc., "Moderator's summary for discussion [RAN93e-R18Prep-02] UL enhancements," 3GPP TSG RAN #93e, e-Meeting, RP-211652, Sep. 13-17, 2021, 92 pages.

Samsung, "Views on UL precoding indication for STxMP," 3GPP TSG RAN WG1 #109-e, e-Meeting, R1-2203893, May 9-20, 2022, 9 pages.

Vivo, "Views on unified TCI framework extension for multi-TRP," 3GPP TSG RAN WG1 #109-e, e-Meeting, R1-2203541, May 9-20, 2022, 20 pages.

ZTE, "Enhancements on unified TCI framework extension for multi-TRP," 3GPP TSG RAN WG1 #109-e, e-Meeting, R1-2203263, May 9-20, 2022, 9 pages.

EPO, Extended European Search Report for European Application No. 22 953 677.6, mailed on May 12, 2025, 9 pages.

International Search Report and Written Opinion for International Application No. PCT/CN2022/106828, mailed on Dec. 19, 2022, 9 pages.

CIPO, Office Action for Canadian Application No. 3,260,675, mailed on Feb. 5, 2026, 6 pages.

JPO, Notice of Allowance for Japanese Application No. 2025-501816, mailed on Mar. 31, 2026, 3 pages with unofficial English translation.

* cited by examiner

POWER CONTROL SCHEMES FOR SIMULTANEOUS UPLINK TRANSMISSIONS

CROSS REFERENCE TO RELATED APPLICATIONS

This patent document is a continuation of and claims benefit of priority to International Patent Application No. PCT/CN2022/106828, filed on Jul. 20, 2022. The entire content of the before-mentioned patent application is incorporated by reference as part of the disclosure of this application.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for power control schemes for simultaneous uplink transmissions.

In one aspect, a wireless communication method is disclosed. The wireless communication method includes, receiving, by a user device scheduled to simultaneously transmit uplink transmissions which are fully or partially overlapped in a time domain and associated with respective transmission information, a message indicating one or more sets of power control parameters associated with at least one transmission information from a network, and determining, based on the message, transmission power of at least one of the uplink transmissions.

In another aspect, a wireless communication method is disclosed. The wireless communication method includes, transmitting, by a network to a user device, a message at least including one or more sets of power control parameters; and receiving, by the network from the user device, transmissions overlapping in time domain and associated with respective transmission information, the transmissions having transmission power that is determined and scaled based on the message associated with at least one transmission information to have a value not greater than a maximum output power.

In another aspect, a communication apparatus comprising a processor configured to implement the above-described method is disclosed.

In another aspect, a computer readable medium having code stored thereon, the code, when executed, causing a processor to implement the above-described method is disclosed.

These, and other features, are described in the present document.

DETAILED DESCRIPTION

The disclosed technology provides implementations and examples of power control schemes for simultaneous uplink transmissions.

Power control is to compensate pathloss, overcome shadow fading and restrain interference by adjusting the transmission power of signals from UE or base station. Power control can be divided into closed-loop based and open-loop based according to whether transmitter (e.g., UE) adjusts transmission power based on information from receiver (base station) or not. Basically closed-loop and open-loop power control work together in NR system, for example, UE adjusting transmission power according to the estimated value of pathloss is regarded as open-loop, and UE adjusting transmission power according to the TPC command from base station is regarded as closed-loop.

In the current NR system, the UE determines the transmission power of the uplink signal based on at least one of the target receiving power, pathloss compensation, power control command, bandwidth, etc. Meanwhile values of maximum output power are specified for different UE classes and cases, and the transmission power of UE is not allowed to exceed the specified values.

Take the following as an example, in NR TS 38.213, PUSCH transmission power $P_{PUSCH,b,f,c}(i, j, q_d, l)$ in PUSCH transmission occasion i on active UL BWP b of carrier f of serving cell c using parameter set configuration with index j and PUSCH power control adjustment state with index l is determined as:

$$P_{PUSCH,b,f,c}(i, j, q_d, l) = \min\left\{\begin{array}{c} P_{CMAX,f,c}(i), \\ P_{O\_PUSCH,b,f,c}(j) + 10\log_{10}(2^{\mu} \cdot M^{PUSCH}_{RB,b,f,c}(i)) + \\ \alpha_{b,f,c}(j) \cdot PL_{b,f,c}(q_d) + \Delta_{TF,b,f,c}(i) + f_{b,f,c}(i, l) \end{array}\right\} \quad \text{Equation (1)}$$

In Equation (1), $P_{CMAX,f,c}(i)$ is the maximum output power for a carrier of a serving cell, $P_{O\_PUSCH}$ is the target receiving power configured by the base station, a is the factor of pathloss compensation, PL is the estimated value of pathloss associated with the reference signal with index $q_d$, $\Delta_{TF}$ is determined based on modulation and coding scheme (MCS), and f is the transmission power adjustment command received in the scheduling DCI.

When the determined transmission power of a signal exceeds the maximum value ($P_{CMAX}$), the UE is required to scale it to be not greater than the maximum value.

The maximum output power in a transmission duration is specified as well, wherein the transmission duration may refer to a duration of slot, sub-slot, frame or sub-frame. Hence, multiple uplink transmissions might be transmitted in a same transmission duration. When the total transmission power of transmissions in a transmission duration exceeds the maximum output power, the UE is required to allocate or scale transmission power of transmissions according to the priority rules.

Figure 1:
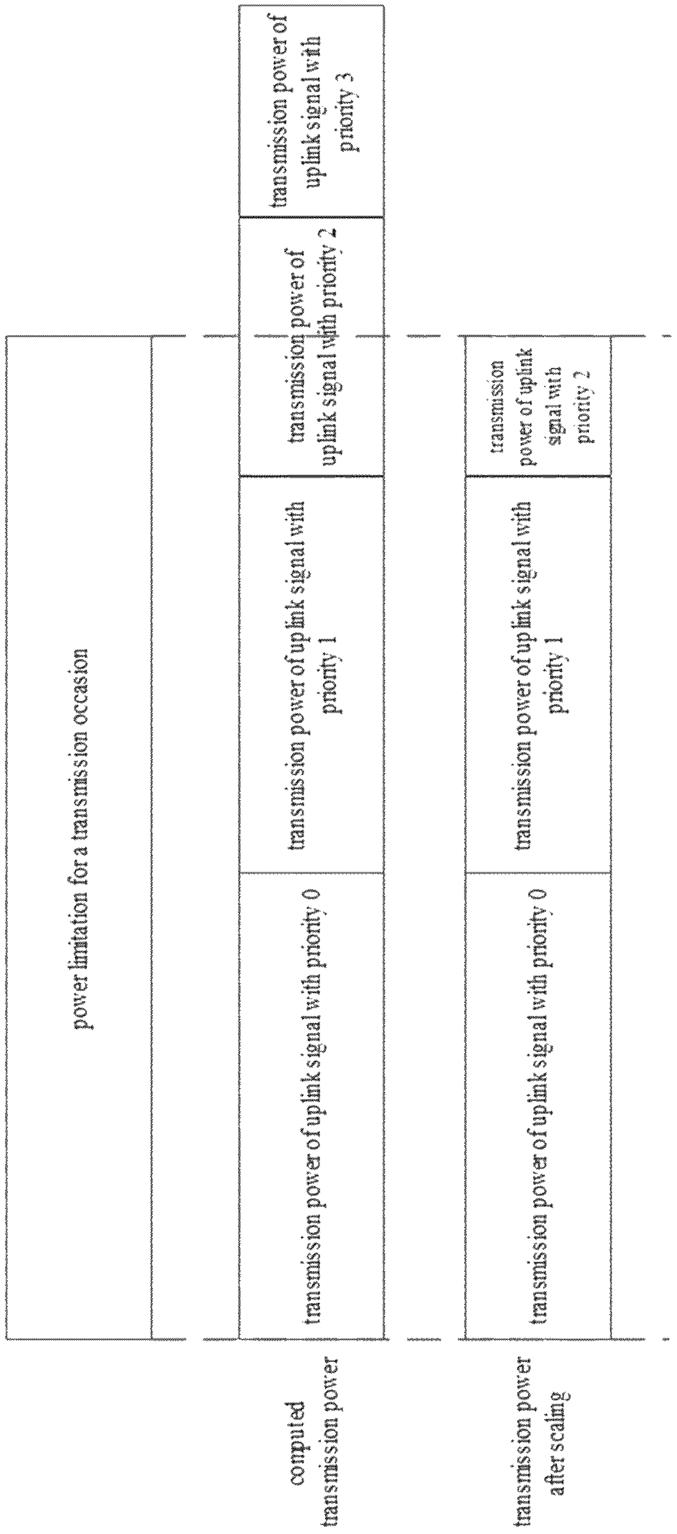
FIG. 1 illustrates a diagram showing power allocating and scaling schemes performed in response to exceeding maximum output power for a transmission duration.

FIG. 1 illustrates a diagram showing power allocating and scaling schemes performed in response to exceeding maximum output power in a transmission duration. As shown in FIG. 1, the power allocation is operated one by one based on the priority order, if the rest power is sufficient for the assigned signal, the transmission power of the signal does not need scaling, if the rest power is not sufficient for the assigned signal, the transmission power of the signal is to be scaled, and the signals with lower priority than the assigned signal is set to be zero.

Recently, multiple Transmit-Receive Points (MTRP) transmission technology has been developing with great progress, and the multiple TRPs can be realized by multiple base stations or multiple panels of one base station. With the gradual development of a user equipment, the number of antennas and panels are increasing, and the types and usage of the equipment become more diverse. For example, 5G Customer Premises Equipment (CPE), communication devices equipped in vehicle and XR equipment currently receive great attentions.

The UE with low capability can only transmit one uplink signal (PUSCH, PUCCH, SRS and PRACH) at the same time resulting from the structure of radio frequency (RF) handling unit. With the development of UE, some UEs with higher capability have multiple panels and multiple RF links, which makes possible for UE to transmit uplink signals through multiple panels at the same time. UE transmitting multiple parts of an uplink signal or multiple uplink signals at the same time through multiple panels can be referred to as STxMP.

Generally, the UE is capable of adjusting the transmission power of the transmitted signals with various considerations such as reducing interference, saving power, improving reliability, etc. The maximum transmission power of the UE and the UE behavior in case of exceeding the maximum output power are specified by the relevant specification, for example, 3GPP. The maximum output power on serving cells in the frequency range and the maximum output power per carrier per serving cell are defined in the relevant specification, for example, 3GPP TS 38.101.

When the UE has the capability of simultaneous uplink transmissions, the UE needs to be capable of determining the respective or total transmission power of uplink transmissions which are simultaneously transmitted in time-domain. Generally, the simultaneous transmissions are transmitted through different panels of the UE, and the UE requires to determine the respective per-panel transmission power.

Figure 2:
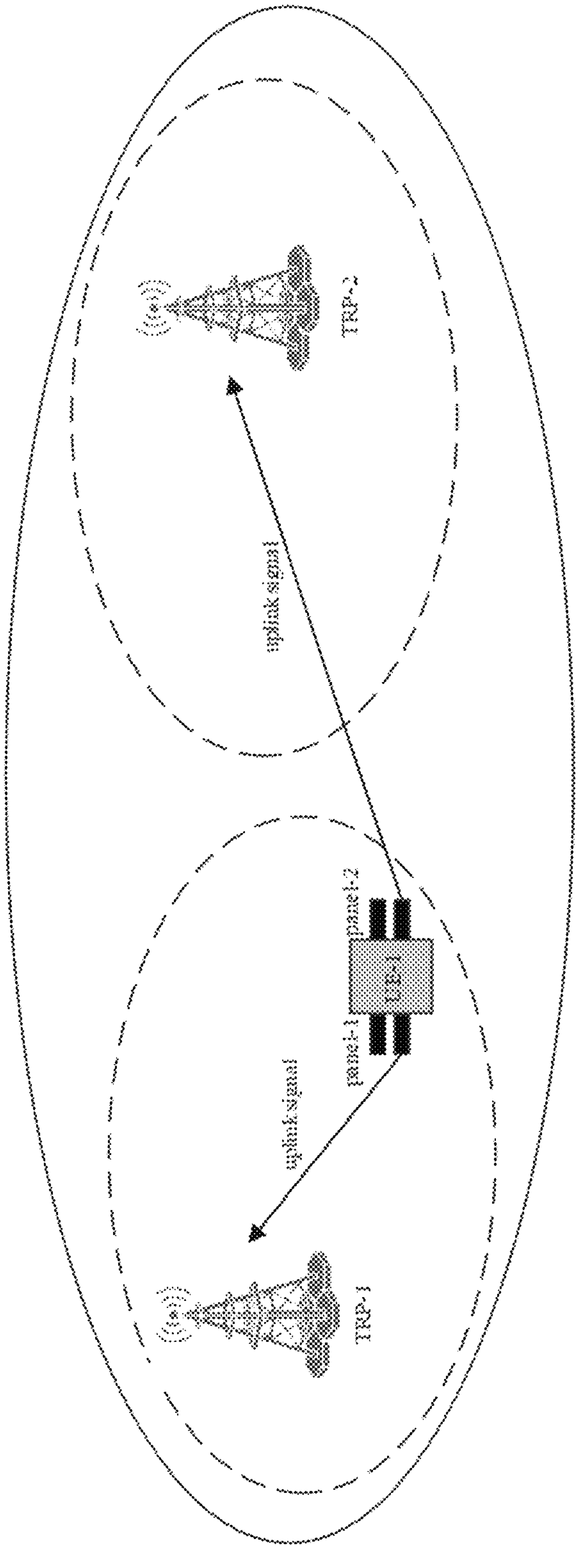
FIG. 2 illustrates an example diagram of simultaneous uplink transmission from multiple panels of the user device in inter-cell multiple TRP (Transmit-Receive Point) case.

FIG. 2 shows an example diagram of simultaneous uplink transmission from multiple panels of the user device in inter-cell multiple TRP case. As shown in FIG. 2, the UE can simultaneously transmit the two uplink signals through two panels. The types of uplink signals can be the same, e.g. both are PUSCH, or different from each other. Thus, the disclosed technology can be applied to both cases that the types of the uplink signals are different and same. In another example, the UE can simultaneously transmit two parts of an uplink signal through two panels. In this case, the two parts of the uplink signal can correspond to the uplink transmissions.

In various scenarios, while the UE is required to address the issue when the transmission power exceeds the maximum output power, the unified or equal scaling schemes are used for simplicity without flexibility. Various implementations of the disclosed technology provide more flexible transmission power determining and scaling schemes to control powers of the transmissions to different TRPs.

For transmission power determination and power allocation/scaling in the case of STxMP, various implementations of the disclosed technology propose following features.

(1) For transmission power determination, the following two directions are considered.

Tx power of uplink transmissions from multiple panels are determined jointly. A total value of transmission power associated with multiple PowerControl parameter set(s)/panel(s)/TCI states is determined by the UE. The UE determines the value of each component in the determining formula based on the values associated with one or more transmission information.

Tx power of uplink transmissions from multiple panels are determined separately. The respective value of transmission power associated with each of PowerControl parameter set(s)/panel(s)/TCI states is determined by the UE.

(2) Regarding the power allocation to panels in case of determining a total transmission power, the following is considered.

The UE determines the transmission power of uplink transmission associated with a transmission information based on at least one message, wherein the message is associated with at least one transmission information. The UE obtains the association between the transmission information and the message according to information elements in RRC signalling, information in MAC CE or indication fields in DCI format.

(3) When the transmission power exceeds the maximum output power for a carrier component, the following scaling schemes are considered.

The UE scales the sum of transmission power of uplink transmissions associated with panels to be not greater than the maximum output power. The scaling factor of each uplink transmission is determined based on at least one message The UE is indicated to not scale the transmission power of uplink transmissions based on a message from the base station.

(4) When the transmission power exceeds the maximum output power in a transmission duration, the following allocating and scaling schemes are considered.

The UE determines the priority of uplink transmissions associated with different panels and allocates/scales the transmission power according to the priority rule. The determination is based on a message from the base station.

The UE scales the transmission power of more than one uplink transmissions with the same allocating priority. The UE determines the scaling factors based on a message from the base station.

Note that, in this patent document, 'TRP' comprises at least one of transmit-receive point, base station or a set of panels of one base station. In some implementations, the TRP comprises at least one of "information grouping one or more reference signals", "resource set", "panel", "sub-array", "antenna group", "antenna port group", "group of antenna ports", "beam group", "physical cell index(PCI)", "TRP index", "CORESET pool index", "UE capability value" or "UE capability set".

Note that, in this patent document, "TRP-Id" corresponds to at least one of CORESET index, CORESET pool index, SS/PBCH index, transmission configuration indicator (TCI) state index, PCI, RS set index, SRS resource set index, spatial relation index, power control parameter set index, panel index, beam group index, sub-array index, the index of CDM group of DMRS ports, the group index of CSI-RS resources, or CMR set index.

Note that, in this patent document, "panel index" corresponds to at least one of UE capability value set index, panel mode index, antenna group index, antenna port group index, beam group index, beam reporting group index, sub-array index, SRS resource set index, spatial relation index, power control parameter set index, CORESETPoolIndex value, or PCI.

Note that, in this patent document, "transmission information" comprises at least one of information grouping one or more reference signals, reference signal resource set, PUCCH resource set, panel related information, sub-array, antenna group, antenna port group, group of antenna ports, beam group, beam state, physical cell index(PCI), TRP related information, CORESET pool index, index of TCI state in a TCI state codepoint, UE capability value or UE capability set.

Note that, in this document, TCI state codepoint is equivalent to TCI state entry or activation of TCI state MAC CE.

Note that, in this patent document, "beam state" is equivalent to quasi-co-location (QCL) state, transmission configuration indicator (TCI) state, spatial relation (also called as spatial relation information), reference signal (RS), spatial filter or pre-coding. For example, the spatial filter can be either at the UE-side or gNB-side, and the spatial filter may also be called as spatial-domain filter. Notes that, in this patent document, "spatial relation information" may comprise one or more reference RSs, which are used to represent the same or quasi-co "spatial relation" between targeted "RS or channel" and the one or more reference RSs. Notes that, in this patent, "beam state" is associated with or comprised of, one or more reference RSs and/or their corresponding QCL type parameters, where QCL type parameters include at least one of the following aspect or combination: [1] Doppler spread, [2] Doppler shift, [3] delay spread, [4] average delay, [5] average gain, and [6] spatial parameter.

In this patent document, "TCI state" may be equivalent to "beam state." In this patent document, "spatial parameter" may be equivalent to spatial parameter, spatial Rx parameter or spatial filter. In this patent, there are the following definitions for 'QCL-TypeA', 'QCL-TypeB', 'QCL-TypeC', and 'QCL-TypeD'.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

Note that, in this patent document, "beam group" comprises at least one beam, beam state or TCI state.

Note that, in this patent document, "uplink signal" can be PUCCH, PUSCH, SRS or PRACH.

Note that, in this patent document, "uplink transmission" comprises at least one of a transmission occasion of an uplink signal, a repetition of an uplink signal or an uplink signal.

Note that, in this patent document, "PL-RS" refers to reference signal used for pathloss measurement.

Note that, in this patent document, "TPC command" refers to the power adjustment amount indication for the associated uplink transmission in DCI format.

Note that, in this patent document, "UCI type" comprises at least one of HARQ-ACK information, SR, LRR or CSI.

Note that, in this patent document, "carrier component" comprises at least one of a carrier for a serving cell or a supplementary uplink carrier for a serving cell.

Figure 3:
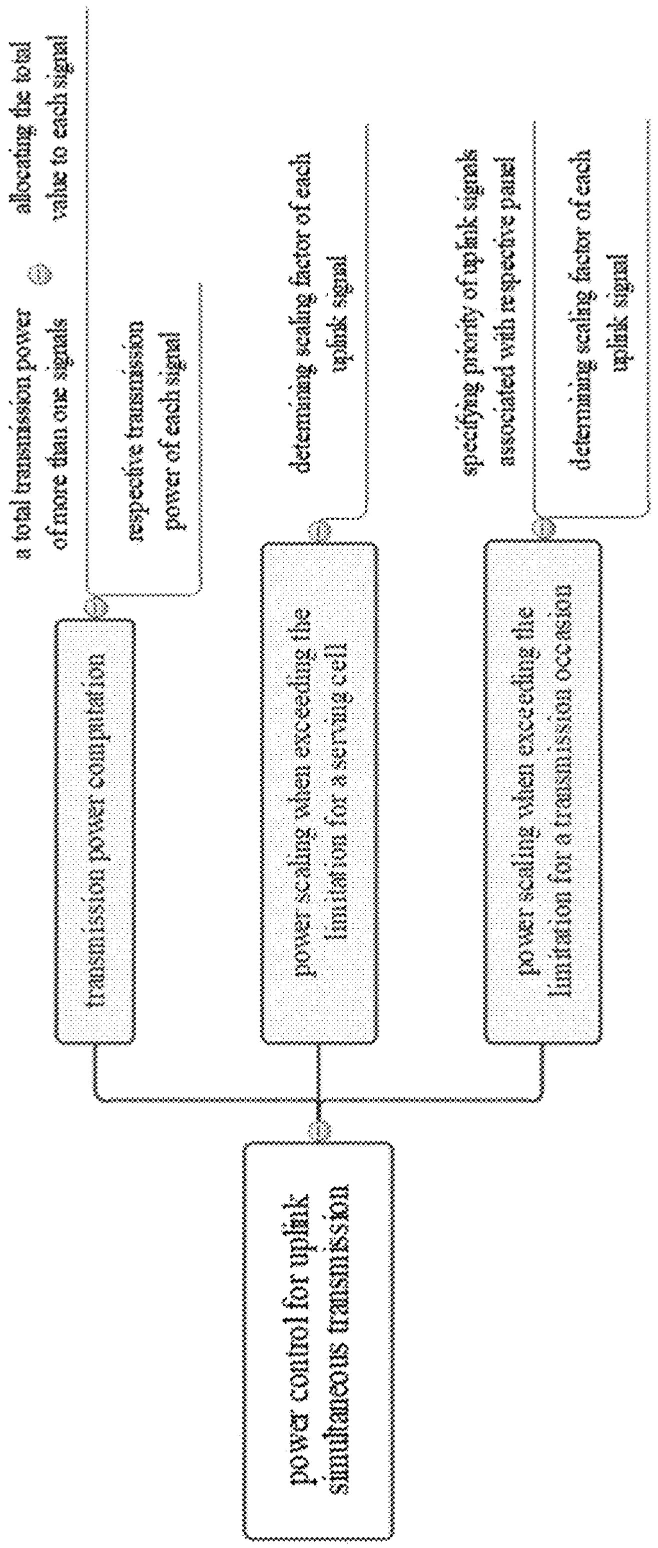
FIG. 3 shows an example diagram to explain the power control for simultaneous uplink transmissions based on some implementations of the disclosed technology.

Various implementations of the disclosed technology provide various approaches for power control, e.g., power determining and allocating operations, for simultaneous uplink transmissions. FIG. 3 shows an example diagram to explain the power control for simultaneous uplink transmissions based on some implementations of the disclosed technology.

The following features are examples of some aspects of the various approaches suggested by the disclosed technology.

(1) Determining transmission power of uplink transmissions that are transmitted fully or partially overlapped in time domain, The UE obtains the association between uplink transmission and the transmission information according to at least one of the index of power control parameter set (group), panel index, the index of spatial relation, index of a resource set, or a TCI state.

Option 1: In some implementations, the UE determines a total transmission power of overlapped transmissions associated with respective transmission information.

In some implementations, the UE determines the total transmission power based on at least one message from the base station. The UE obtains the association between transmission information and the message based on RRC signalling, MAC CE or DCI format. In some implementations, the message comprises at least one of a target receiving power value, a TPC command, a measured value of pathloss associated with a PL-RS, a modulation and coding scheme, a bandwidth, a sub-carrier spacing, the number of the occupied physical resources, or a PUCCH format. The UE uses at least one of the message as power control parameters to determine the transmission power.

In some implementations, the UE determines an actual value of a power control parameter that is used to determine the transmission power. For example, when the message comprises multiple candidate values associated with different transmission information for at least one power control parameter, the UE determines to use the average value of the parameter, the maximum or minimum value of the parameter, one of the parameters indicated by the bases station, or the weighted mean value to determine the transmission power. For example, when the message comprises a TPC command for uplink transmission associated with TRP-1 and a TPC command for uplink transmission associated with TRP-2, the UE determines to use the value for the TPC command used for determining the transmission power. For example, the UE may determine to use only one of the value, e.g., the value associated with TRP-1 or the value associated with TRP-2. In another example, the UE may determine to use the average value, the maximum, the minimum, or the weighted mean value of those associated with TRP-1 and TRP-2. In some implementations, the weights that determine the weighted value above are included in the message from base station.

In some implementations, the UE reports to the base station a message that comprises the information determined by the UE. In some implementations, the report message may include at least one of the actual value of the power control parameter or a range containing the actual value of the power control parameter. In some implementations, the report message may further include transmission information (index) associated with the determined information or a flag of the power control parameter (e.g. an indication to represent Pathloss).

Option 2: The UE determines the respective transmission power of simultaneous transmissions associated with the respective transmission information.

In some implementations, the UE determines the transmission power based on at least one message from the base station, wherein the message comprises at least one of a target receiving power value, a TPC command, a measured value of pathloss associated with a PL-RS, a modulation and coding scheme, bandwidth, a sub-carrier spacing, the number of occupied physical resources, or PUCCH format. The message is associated with a transmission information. For example, the UE determines the transmission power of transmission associated with transmission information index 1 and transmission information index 2 based on message associated with transmission information index 1 and transmission information index 2, respectively.

The determining of the transmission power will be more discussed later in this patent document in relation to Embodiment 1.

(2) Determining of transmission power of respective uplink transmission when a total transmission power of simultaneous transmissions associated with respective transmission information is determined by the UE.

The UE determines the transmission power of a uplink transmission associated with transmission information based on at least one message from base station, and the message is associated with at least one transmission information. In some implementations, the message from the base station comprises at least one of a target receiving power value, a measured value of pathloss associated with a PL-RS, a bandwidth, the number of occupied physical resources, a PUCCH format, a default factor, a factor indication, the number of SRS resource ports, or the number of antenna ports of the UE panel.

In some implementations, the determination is based on the determined total transmission power.

The determining of transmission power will be more discussed later in this patent document in relation to Embodiment 2.

(3) Scaling of transmission power in case of exceeding the maximum output power for a carrier component.

In some implementations, the maximum output power of the UE for a carrier component (hereinafter called '$P_{CMAX,f}$') is specified. In some implementations, the maximum output power associated with transmission information (hereinafter called 'Pcmax,p') is specified. In some implementations, $P_{CMAX,p}$ is determined by $P_{CMAX,f}$ and a message from base station associated with the transmission information.

$P_{CMAX,p}$ is based on $P_{CMAX,f}$ and not greater than $P_{CMAX,f}$. In some implementations, the base station sends a message to the UE which includes a factor 'm' to indicate the value of Pcmax,p. (e.g. $P_{CMAX,p}$=m*$P_{CMAX,f}$)

In some implementations, the UE scales the transmission power of an uplink transmission to be not greater than $P_{CMAX,p}$ associated with the uplink transmission.

In some implementations, the UE scales the transmission power of at least one uplink transmission associated with one transmission information to make the total transmission power of uplink simultaneous transmissions to be not greater than $P_{CMAX,f}$.

In some implementations, the UE determines the scaling factors for uplink transmissions which require transmission power scaling. In some implementations, a common scaling factor is used for all uplink transmissions. In some implementations, the determination of the scaling factor is based on at least one message from base station. In some implementations, the message from the base station is associated with at least one transmission information. In some implementations, the message from the base station comprises at least one of a target receiving power, a default factor or a factor indication. In some implementations, the information associated with at least one transmission information comprises at least one of a target receiving power value, a measured value of pathloss associated with a PL-RS, a bandwidth, the number of occupied physical resources, a PUCCH format, a default factor, a factor indication, the number of SRS resource ports, or the number of antenna ports of the UE panel.

In some implementations, the base station sends a message to UE to indicate at least one transmission information or uplink transmission which requires no transmission power scaling.

The scaling of the transmission power will be more discussed later in this patent document in relation to Embodiment 3.

(4) Scaling transmission power in case of exceeding the maximum output power in a transmission duration.

The maximum output power of the UE in a transmission duration (hereinafter called '$P_{CMAX,i}$') is specified, wherein the transmission duration comprises a symbol, a slot, a sub-slot, a frame or a sub-frame.

In some implementations, the UE scales the transmission power of each uplink transmission based on a priority rule. Referring back to FIG. 1, each uplink transmission has a corresponding priority and the UE allocates the power to the uplink transmissions based on the priorities associated with the uplink transmissions. The determined total transmission power of uplink transmissions in a transmission duration is scaled and allocated to satisfy the demands for the uplink transmissions having higher priorities based on the priority rule.

In some implementations, the scaling of the transmission power may be not needed. For example, when the sum of the determined transmission power of the uplink transmissions with priorities higher than that of a certain uplink transmission and the transmission power of the certain uplink transmission is not greater than $P_{CMAX,i}$, the UE does not scale the transmission power of the certain uplink transmission.

In some implementations, the UE scales the transmission power of an uplink transmission when the sum of the determined transmission power of the uplink transmissions with priorities higher than that of the certain uplink transmission and the determined transmission power of the certain uplink transmission is greater than $P_{CMAX,i}$.

In some implementations, the UE scales the transmission power of uplink transmissions to be zero when no transmission power can be allocated to the uplink transmissions.

In some implementations, the priority of transmissions of PUCCH and PUSCH carrying the same UCI type associated with different transmission information is determined based on a message from base station. In some implementations, the message comprises at least one of RRC signaling, DCI format or MAC CE. The message comprises at least one of a target receiving power value, a measured value of pathloss associated with a PL-RS, a bandwidth, the number of the occupied physical resources, a PUCCH format, a default factor, a factor indication, the number of SRS resource ports, the number of antenna ports of the UE panel or the indication of transmission information.

In some implementations, the UE scales the transmission power of more than one uplink transmissions (certain multiple uplink transmissions) when the total transmission power of the transmissions with priority higher than those of all the certain multiple uplink transmissions and the transmission power of the certain multiple uplink transmissions is larger than the maximum output power, $P_{CMAX,i}$. The certain multiple uplink transmissions are determined to have the same allocating priority.

In some implementations, the scaling factor of each uplink transmission is determined based on at least one message from the base station, wherein the message from the base station is associated with at least one transmission information. The message from the base station comprises at least one of a target receiving power value, a measured value of pathloss associated with a PL-RS, a bandwidth, the number of occupied physical resources, a PUCCH format, a default factor, a factor indication, the number of SRS resource ports, the number of antenna ports of the UE panel or the indication of transmission information The scaling of the transmission power will be more discussed later in this patent document in relation to Embodiment 4.

In the Embodiments 1-4, which are discussed below, two uplink transmissions are transmitted simultaneously through multiple panels. The two uplink transmissions are the example only and the disclosed technology is not limited to the two uplink transmissions.

Embodiment 1

In Embodiment 1, the transmission power of uplink transmissions which are transmitted overlapped in time domain is determined. The UE determines the transmission power of more than one simultaneous uplink transmissions at a time based on the message from base station, wherein the message comprises a plurality of configured power control parameters and other power control parameters obtained or measured by the UE.

In some implementations, the UE determines the transmission power based on at least one of the power control parameters. Examples of the power control parameters may include at least one of target receiving power, pathloss compensation factor, pathloss associated with a PL-RS, closed-loop power control command, a bandwidth, the number of occupied physical resources, a modulation and coding scheme, or sub-carrier spacing.

In some embodiments, the UE is respectively or commonly configured/indicated with at least one set of the power control parameters for each transmission information. Each set of the power control parameters includes at least one of the target receiving power, pathloss compensation factor, an index of reference signal for pathloss measurement, a closed-loop power control command, a bandwidth, the number of the occupied physical resources, a modulation and coding scheme, or a sub-carrier spacing. The UE may determine common or separate values of at least one of the power control parameters for each transmission information.

In some embodiments, the UE determines a total transmission power of more than one uplink transmissions that are to be transmitted simultaneously. UE determines the value of each parameter in the determining formula based on the power control parameters associated with at least one of the transmission information.

In some embodiments, the UE receives a message from the base station, wherein the message indicates the UE to select one value of a power control parameter to determine the total transmission power. The message can be RRC signaling, MAC CE, or DCI format. For example, if an information element of RRC signaling includes an indication for the UE to select one value of a power control parameter and the value of the indication is set to be 1, the UE selects the a value of power control parameter associated with the transmission information with index 1 to determine the transmission power.

In some embodiments, the UE selects one value of a power control parameter to determine the total transmission power based on a default rule. For example, according to the default rule, the UE selects the maximum or the minimum value among the values associated with respective transmission information for a power control parameter.

In some embodiments, the UE determines an actual value of the power control parameter that is to be used to determine the total transmission power. When the UE receives or obtains the power control parameters associated with more than one transmission information, the UE determines the value of the power control parameters based on various rules, for example, weighted mean, average value, or sum value. The weights for each value are indicated by the base station. For example, the UE obtains the pathloss PL-1 associated with the panel 1 and the pathloss PL-2 associated with the panel 2. In some implementations, the UE determines the average value of PL-1 and PL-2 as the pathloss compensation parameter to determine the total transmission power.

In some embodiments, the UE sends a message to the base station in a uplink transmission. The message comprises at least one of the selected/determined value of the power control parameter, the value range containing the selected/determined value of parameter, the index of transmission information associated with the selected/determined value, or the flag of the power control parameter. For example, the UE determines to select the value of pathloss measured based on the PL-RS associated with panel-1 to determine the total transmission power, and UE reports to the base station the panel index of panel-1 and the flag of pathloss in a transmission of PUSCH.

In some embodiments, the UE separately determines the transmission power of each of the simultaneous uplink transmissions. In this case, the UE determines the transmission power based on power control parameters which are associated with the respective transmission information.

Figure 4:
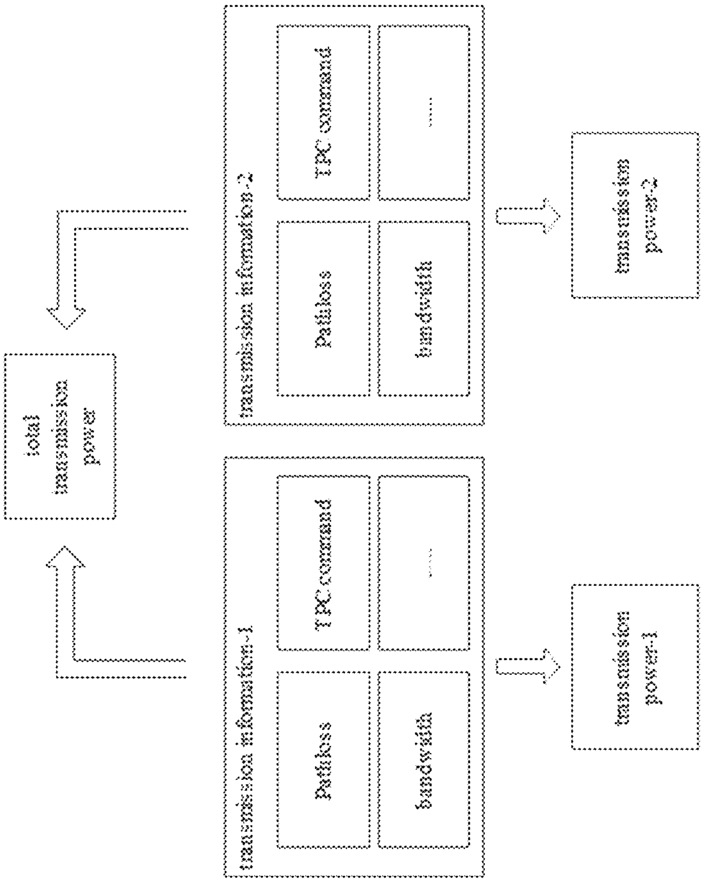
FIG. 4 illustrates transmission power determining schemes in the case of STxMP based on some implementations of the disclosed technology.

FIG. 4 illustrates transmission power determining schemes in the case of STxMP based on some implementations of the disclosed technology. Referring to FIG. 4, there exist two separate transmission information, i.e., transmission information 1 and transmission information 2. The total transmission power is determined based on the power control parameters associated with transmission information 1 and power control parameters associated with transmission information 2. The UE is required to process multiple values of the same power control parameter. For example, for the same power control parameter, e.g., the TPC command, the transmission information 1 and the transmission information 2 have different values from each other.

Embodiment 2

Embodiment 2 is related to the determining of the transmission power of each uplink transmission associated with respective transmission information in the case that the total power transmission is determined by the UE for the multiple uplink transmissions. In the description below, the determined total transmission power of the uplink transmissions is indicated as $P_t$.

In some embodiments, the UE determines the respective transmission power based on the at least one of the power control parameters which are included in the determining formula. The parameters comprises at least one of the target receiving power, pathloss compensation factor, index of reference signal for pathloss measurement, closed-loop power control command, a bandwidth, the number of occupied physical resources, a modulation and coding scheme, or a sub-carrier spacing. For example, the UE obtains the pathloss PL-1 associated with the panel 1 and the pathloss PL-2 associated with the panel 2. The UE determines the transmission power of the uplink transmission for panel-1 to be $P_t$*(PL-2)/(PL-1+PL-2) and the transmission power of the uplink transmission for panel-2 to be $P_t$*(PL-1)/(PL-1+PL-2).

In some embodiments, the UE determines the respective transmission power based on a message from base station. The message comprises at least one of an allocation factor or the number of SRS resource ports. For example, the UE receives an indication with value m included in the RRC signaling and determines the transmission power of the uplink transmission for panel-1 to be m*$P_t$ and the transmission power of the uplink transmission for panel-2 to be (1−m)*$P_t$. In another example, the UE is indicated with the number of SRS resource ports for uplink transmissions associated with panel-1 and panel-2 to be a and b, respectively, and the UE determines the transmission power of uplink transmission associated with panel-1 and panel-2 to be $P_t$*a/(a+b) and $P_t$*b/(a+b), respectively.

In some embodiments, the UE determines the respective transmission power based on a message that comprises at least one of a default factor, a factor indication or the antenna ports of a panel. For example, when the antenna ports of panel-1 and panel-2 are $N_1$ and $N_2$, respectively, the UE determines the transmission power of the uplink transmission for panel-1 to be $P_t*N_1/(N_1+N_2)$ and the transmission power of the uplink transmission for panel-2 to be $P_t*N_2/(N_1+N_2)$. In another example, when the default factor or the indicated factor is m, the UE determines the transmission power of the uplink transmission for panel-1 to be m*$P_t$ and the transmission power of the uplink transmission for panel-2 to be (1−m)*$P_t$.

Embodiment 3

Embodiment 3 provides the example to scale transmission power in case that the sum of determined transmission power of simultaneous uplink transmissions exceeds the maximum output power, wherein the maximum output power is specified for a carrier component for a serving cell. In the examples given below, only some specific schemes to determine the scaling factor are considered. One of those skilled in the art would understand that other schemes based on the message from the bases station can be applied to determine the scaling factor.

In some embodiments, the UE is specified with per panel maximum output power and the sum of per panel maximum output power equal to maximum output power for a carrier component, wherein per panel maximum output power is specified based on at least one of “a default factor”, “an indicated factor”, “the number of antenna ports”, “the UE capability value”, a plurality of predefined value sets, or a plurality of predefined value tables. The UE limits the transmission power of an uplink transmission associated with a transmission information to be not greater than a per panel maximum output power and limits the transmission power of another uplink transmission associated with another transmission information to be not greater than another per panel maximum output power.

Figure 5:
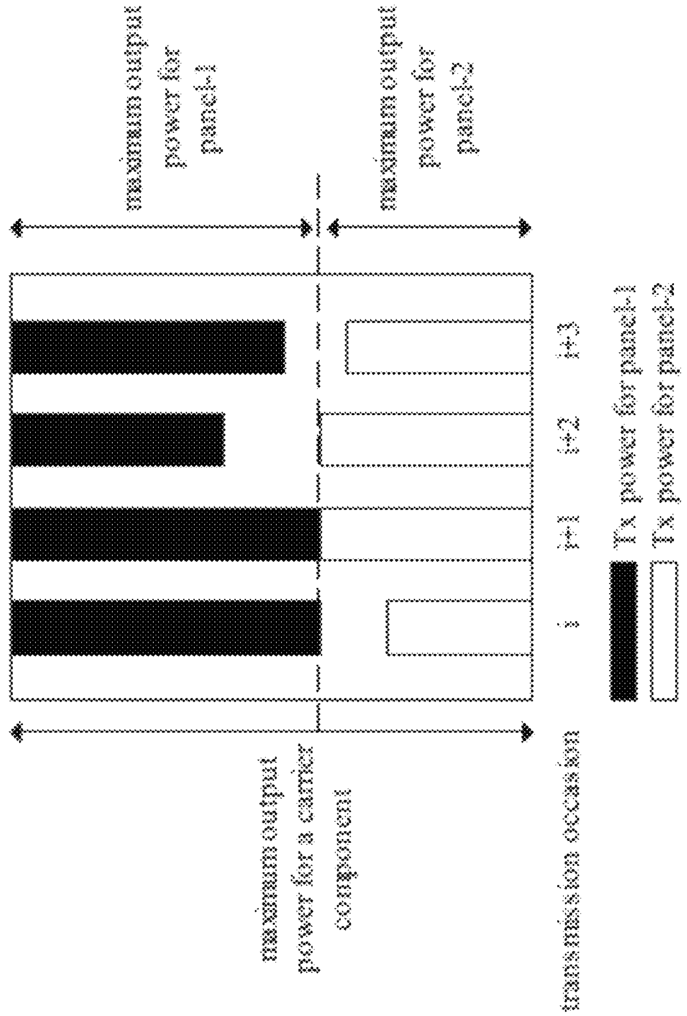
FIG. 5 illustrates an example diagram showing the transmission power when per panel maximum output power is specified and the sum of the maximum output power for panel-1 and the maximum output power for panel-2 equals to the maximum output power for a carrier component.

FIG. 5 illustrates an example diagram showing the transmission power when per panel maximum output power is specified. In FIG. 5, the sum of the maximum output power for panel-1 and panel-2 equals to the maximum output power for a carrier component. As illustrated in FIG. 5, the determined transmission power of the uplink transmissions associated with panel-1 are not greater than the maximum output power for panel-1, and transmission power of the uplink transmissions associated with panel-2 are not greater than the maximum output power for panel-2.

Figure 6:
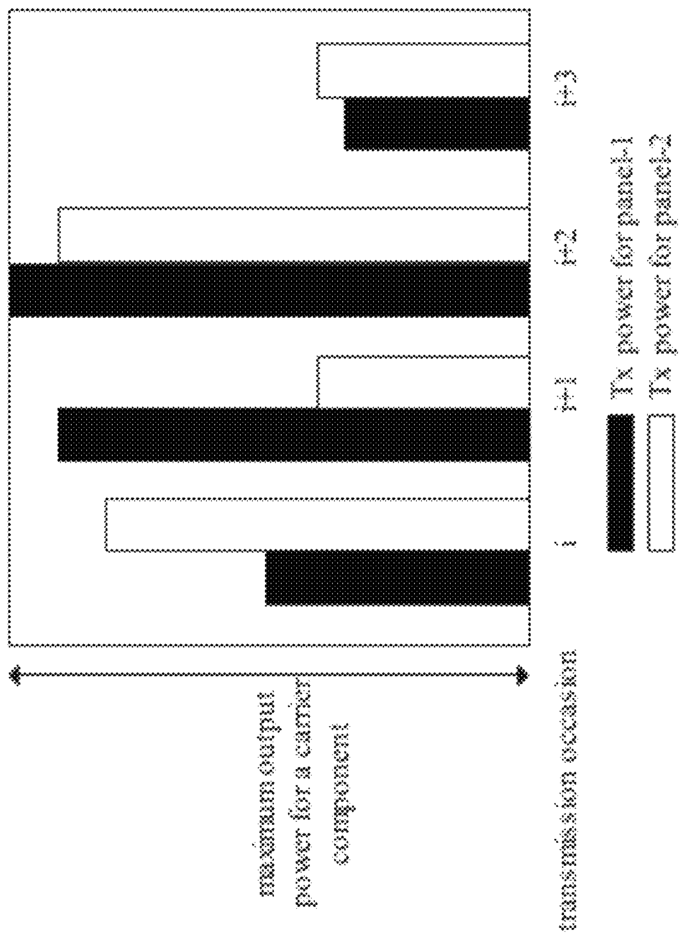
FIG. 6 illustrates an example diagram showing the transmission power when per panel maximum output power is not specified.

FIG. 6 illustrates an example diagram showing the transmission power when per panel maximum output power is not specified or the per panel maximum output power equals to maximum output power for a carrier component. In some implementations, the UE limits the transmission power of a uplink transmission associated with transmission information to be not greater than the maximum output power for a carrier component, and the UE limits the transmission power of another uplink transmission associated with different transmission information to be not greater than the maximum output power for a carrier component.

Figure 7:
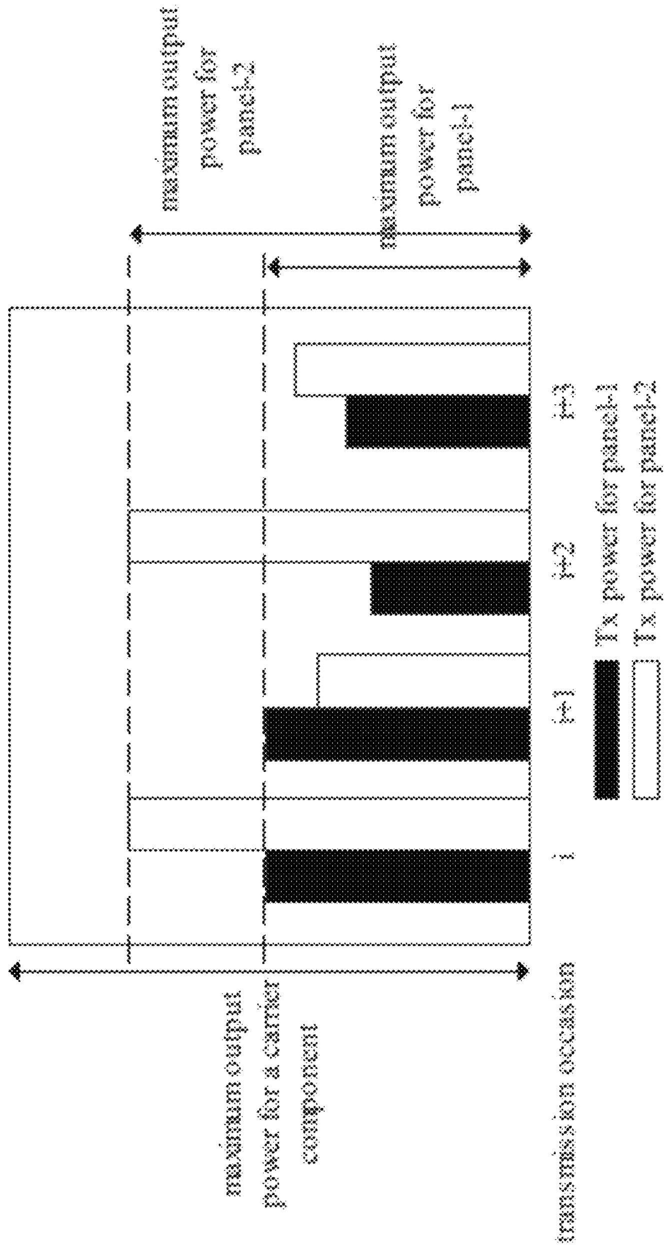
FIG. 7 illustrates an example diagram showing the transmission power when per panel maximum output power is specified and the sum of the maximum output power for panel-1 and the maximum output power for panel-2 is greater than the maximum output power for a carrier component.

FIG. 7 illustrates an example diagram showing the transmission power when per panel maximum output power is specified. In FIG. 7, the sum of the maximum output power for panel-1 and the maximum output power for panel-2 is larger than the maximum output power for a carrier component, wherein per panel maximum output power is specified based on at least one of “a default factor”, “an indicated factor”, “the number of antenna ports”, “the UE capability value”, a plurality of predefined value sets, or a plurality of predefined value tables. In some implementations, when the UE limits the transmission power of an uplink transmission associated with transmission information to be not greater than the maximum output power for panel-1 and the UE further limits the transmission power of another uplink transmission associated with different transmission information to be not greater than the maximum output power for panel-2.

In some embodiments, when the total transmission power of the uplink transmissions associated with different transmission information exceeds the maximum output power for a carrier component and the respective transmission power of each uplink transmission is below the maximum output power for the corresponding transmission information, the UE scales at least one transmission power of an uplink transmission to make the sum of transmission power after scaling to be not greater than the maximum output power for a carrier component.

In some embodiments, the UE determines the scaling factor for each of the uplink transmissions which requires transmission power scaling. The determination is based on at least one message from the base station, wherein the message is associated with at least one transmission information. The message from the base station may comprise at least one of a target receiving power value, a measured value of pathloss associated with a PL-RS, a bandwidth, the number of the occupied physical resources, a PUCCH format, a default factor, a factor indication, the number of SRS resource ports, the number of antenna ports of the UE panel or the indication of transmission information. For example, assume that the base station indicates the UE a factor m for panel-1, the determined transmission power of the uplink transmissions for panel-1 and panel-2 are X and Y, respectively, and the maximum output power for a carrier component is $P_{cmax,f}$. In the example, the UE scales v(mX+Y) to be not greater than $P_{cmax,f}$, wherein v*m is the scaling factor for the transmission power of the uplink transmission associated with panel-1, and v is the scaling factor for the transmission power of the uplink transmission associated with panel-2. The message from the base station determines the value of m, and the determination of v is up to UE.

In some embodiments, the UE receives or obtains multiple values of the same type of message and each value is associated with a transmission information, and the UE determines the scaling factor of each of the simultaneous uplink transmission based on these multiple values. For example, UE obtains the message that the number of SRS resource ports associated with panel-1 and panel-2 are A and B, respectively, and the determined transmission power of the uplink transmissions for panel-1 and panel-2 are X and Y, respectively, and the maximum output power for a carrier component is $P_{cmax,f}$. In the example, the UE scales v(AX+BY)/(A+B) to be not greater than $P_{cmax,f}$, wherein v*A/(A+B) is the scaling factor for the transmission power of the uplink transmission associated with panel-1, and v*B/(A+B) is the scaling factor for the transmission power of the uplink transmission associated with panel-2. The message from the base station determines the value of A and B, and the determination of v is up to UE.

In some embodiments, the UE determines a same scaling factor for the uplink transmissions which requires transmission power scaling. For example, the determined transmission power of the simultaneous uplink transmissions for panel-1 and panel-2 are X and Y, respectively, and the maximum output power for a carrier component is $P_{cmax,f}$. The UE scales v(X+Y) to be not greater than $P_{cmax,f}$, wherein v is the common scaling factor determined by UE.

In some embodiments, the UE receives a message from base station, wherein the message indicates at least one transmission information, and the UE does not scale the transmission power of the uplink transmissions associated with the indicated transmission information. For example, the determined transmission power of uplink transmissions for panel-1 and panel-2 are X and Y, respectively, and the maximum output power for a carrier component is $P_{cmax,f}$, and the base station indicates the UE not to scale transmission power of transmissions associated with panel-2. In this case, the UE scales vX to be not greater than $P_{cmax,f}$−Y, wherein v is the scaling factor. The indication instructing the UE not to scale the transmission power of uplink transmissions associated with certain transmission information can be implemented with a specific value. For example, in the 3 GPP TS specification, such indication has a value equal to 1. In some embodiments, the message indicates at least one transmission information, and the UE only scales the transmission power of the uplink transmission associated with the indicated transmission information.

Embodiment 4

Embodiment 4 provides the example to scale transmission power in case that the determined transmission power exceeds the maximum output power in a transmission duration. The maximum output power is specified to limit the total transmission power of multiple uplink transmissions transmitted in the same transmission duration and thus the total transmission power of the multiple uplink transmissions is limited to be not greater than the maximum output power.

When the total transmission power for transmissions transmitted in the same transmission duration exceeds the maximum output power in a transmission duration, the UE allocates and/or scales the transmission power for transmissions based on the priority rule.

In some embodiments, for simultaneous uplink transmissions of PUCCH or PUCCH which carry the same UCI type and are scheduled by DCI in which the priority indication is the same, the UE determines the power allocation priority based on the message associated with the transmission information. The message from the base station comprises at least one of a target receiving power value, a measured value of pathloss associated with a PL-RS, the number of SRS resource ports, the number of antenna ports of the UE panel or the indication of transmission information. For example, the base station indicates the UE to prioritize power allocation for transmissions associated with panel-1. For example, UE determines the priority of uplink transmission which is determined a larger value of transmission power to be higher than that with a minor value of transmission power.

In some embodiments, for transmissions of PUCCH or PUSCH which carry the same UCI type and are scheduled by DCI in which the priority indication is the same, and the transmissions are simultaneously transmitted and are associated with different transmission information, the UE allocates the transmission power to the transmissions above simultaneously.

In some embodiments, to simultaneously allocate the transmission power of the simultaneous uplink transmissions, the UE scales the transmission power of uplink transmissions such that the total allocated transmission power to be not greater than the maximum output power in a transmission duration. The UE determines the scaling factors of uplink transmissions based on a message, wherein the message comprises at least one of a target receiving power value, a measured value of pathloss associated with a PL-RS, the number of SRS resource ports, the number of antenna ports of the UE panel, a default factor, a factor indication or the determined transmission power. For example, assume that the determined transmission powers of transmissions associated with panel-1 and panel-2 are X and Y, respectively, and the base station indicates a factor value a for panel-1 and another factor value b for panel-2, $P_{cmax,i}$ is the maximum output power in a transmission duration, and $P_{allo}$ is the allocated power of uplink transmissions with higher priority. In this case, in the example, the UE scales v(aX+bY) to be not greater than $P_{cmax,i}-P_{allo}$, wherein va and vb are scaling factors. For another example, assume that the determined transmission power of transmissions associated with panel-1 and panel-2 are X and Y, respectively, the base station indicates target receiving power value $P_1$ for panel-1 and another value $P_2$ for panel-2, $P_{cmax,i}$ is the maximum output power in a transmission duration, and $P_{allo}$ is the allocated power of uplink transmissions with higher priority. In this case, in the example, the UE scales v(aX+bY) to be not greater than $P_{cmax,i}-P_{allo}$, wherein a equal to $P_1/(P_1+P_2)$ and b equal to $P_2/(P_1+P_2)$.

Figure 8:
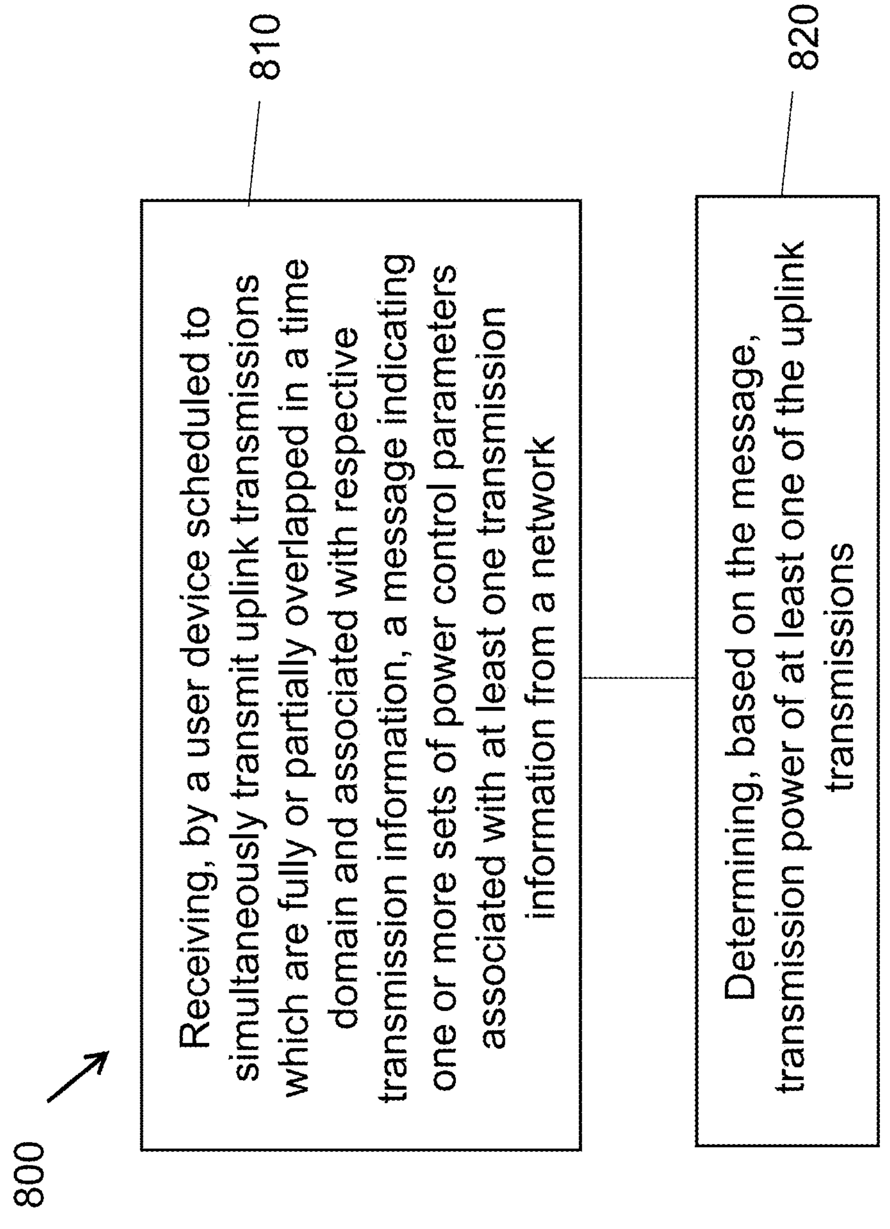
FIGS. 8 and 9 illustrate flowcharts showing example methods of wireless communication based on some implementations of the disclosed technology.

FIG. 8 illustrates a flowchart showing an example method of wireless communication based on some implementations of the disclosed technology. The method 800 includes, at operation 810, receiving, by a user device scheduled to simultaneously transmit uplink transmissions which are fully or partially overlapped in a time domain and associated with respective transmission information, a message indicating one or more sets of power control parameters associated with at least one transmission information from a network. The method 800 further includes, at operation 820, determining, based on the message, transmission power of at least one of the uplink transmissions.

In some implementations, an uplink transmission comprises at least one of a transmission occasion of an uplink signal, a repetition of an uplink signal, or an uplink signal comprising PUCCH, PUSCH, SRS or PRACH, and wherein the transmission information comprises at least one of information grouping one or more reference signals, reference signal resource set, PUCCH resource set, panel related information, sub-array, antenna group, antenna port group, group of antenna ports, beam group, beam state, physical cell index(PCI), TRP related information, CORESET pool index, index of TCI state in a TCI state codepoint, UE capability value or UE capability set.

In some implementations, the method 800 further comprises obtaining, by the user device, the association between the message and transmission information based on the message. In some implementations, the determining of the transmission power comprises determining a total transmission power of the uplink transmissions or determining respective transmission power for each uplink transmission. In some implementations, the method 800 further comprises determining an actual value of a power control parameter used to determine the total transmission power, wherein the actual value is determined as one of an average, a sum, a weighted mean, or maximum or minimum of received values of the power control parameter associated with respective transmission information.

In some implementations, the method 800 further comprises determining the respective transmission power based on a plurality of power control parameters associated with the respective transmission information. In some implementations, the method 800 further comprises: transmitting, by the user device to the network, a reporting message that includes at least one of the actual value of the power control parameter, an index of transmission information associated with the actual value, or a flag of the actual value of the power control parameter. In some implementations, the method 800 further comprises allocating the total transmission power to each uplink transmission based on the message associated with the at least one transmission information.

In some implementations, the determining of the transmission power includes limiting the transmission power of an uplink transmission to be not greater than a maximum output power associated with the at least one transmission information. In some implementations, the maximum output power is determined based on the message associated with the at least one transmission information. In some implementations, the method 800 further comprises determining at least one scaling factor for the at least one of the uplink transmissions when total transmission power of the uplink transmissions exceeds a maximum transmission power. In some implementations, a scaling factor is determined based on the message associated with the at least one transmission information.

In some implementations, the method 800 further comprises: receiving, from the network, a message to indicate that the transmission power of an uplink transmission associated with a specific transmission information requires no scaling. In some implementations, the method 800 further comprises determining a scaling factor of the transmission power of the uplink transmission associated with the specific transmission information to have a value to skip scaling of the transmission power of the uplink transmission. In some implementations, the value is 1.

In some implementations, the method 800 further comprises determining at least one scaling factor to limit the transmission power of at least one of the uplink transmissions when the total transmission power of uplink transmissions exceeds a maximum output power in a transmission duration. In some implementations, a transmission power of an uplink transmission is scaled based on priorities of the uplink transmissions. In some implementations, the priorities are determined based on the message associated with the at least one transmission information. In some implementations, the uplink transmissions carry a same uplink control information (UCI) type and are associated with different transmission information. In some implementations, transmission powers of certain multiple uplink transmissions with a same priority are scaled in case that a sum of transmission powers of uplink transmission with higher priorities and the certain multiple uplink transmissions satisfies a predetermined condition. In some implementations, a scaling factor of an uplink transmission is determined based on the message associated with at least one transmission information.

Figure 9:
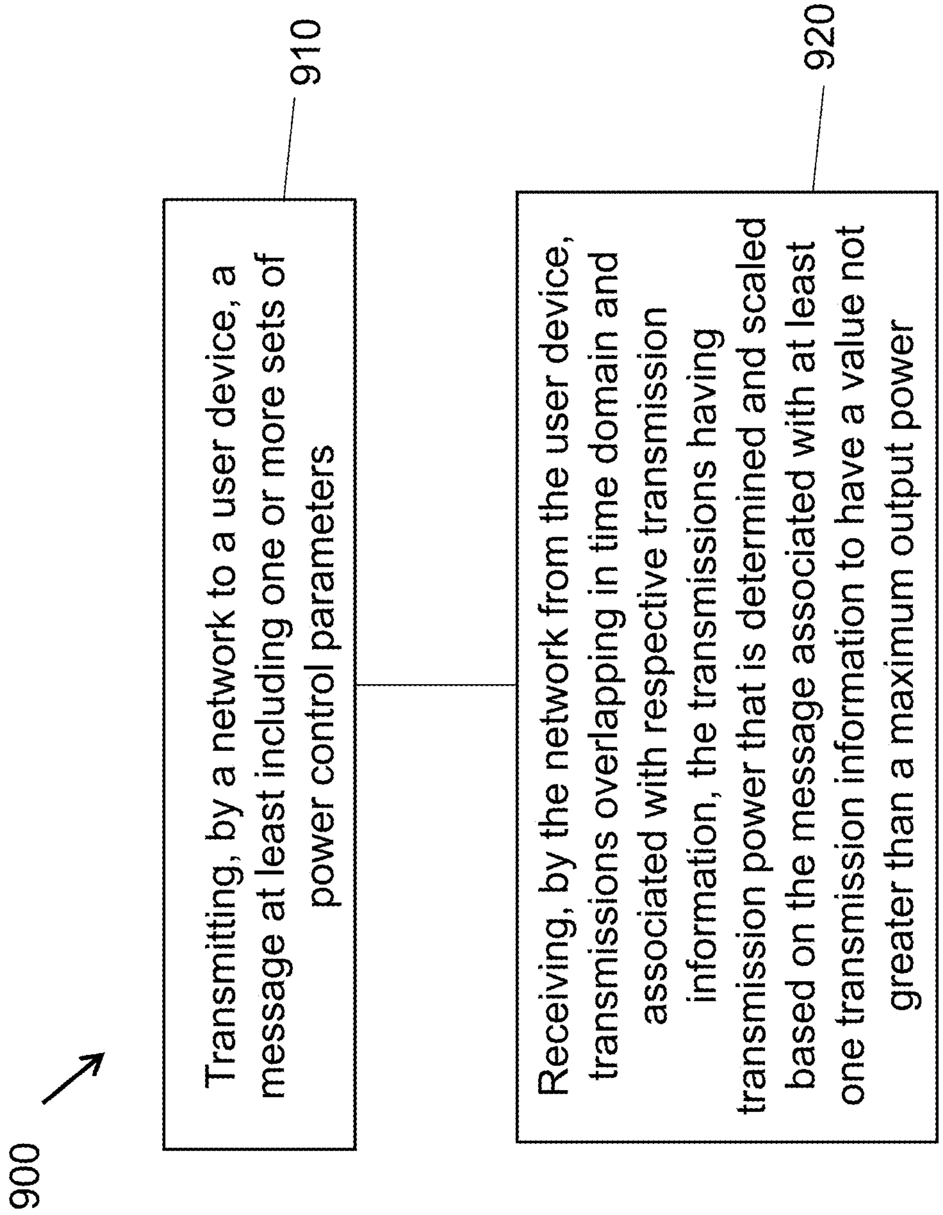

FIG. 9 illustrates a flowchart showing an example method of wireless communication based on some implementations of the disclosed technology. The method 900 includes, at operation 910, transmitting, by a network to a user device, a message at least including one or more sets of power control parameters. The method 900 further includes, at operation 920, receiving, by the network from the user device, transmissions overlapping in time domain and associated with respective transmission information, the transmissions having transmission power that is determined and scaled based on the message associated with at least one transmission information to have a value not greater than a maximum output power.

In some implementations, the method 900 further comprises: receiving, by the network from the user device, a reporting message that includes at least one of an actual value of a power control parameter, an index of transmission information associated with the actual value, or a flag of the actual value of the power control parameter. In some implementations, the transmission power are determined based on at least one scaling factor for at least one transmission when total transmission power of the transmissions exceeds the maximum output power for a carrier component, the scaling factor is determined based on the message. In some implementations, the method 900 further comprises: transmitting, by the network to the user device, a message to indicate that transmission power of a certain transmission associated with a specific transmission information requires no scaling. In some implementations, the transmission power of the transmissions is scaled based on a scaling factor to limit the transmission power of the transmissions when total transmission power of the transmissions exceeds the maximum output power in a transmission duration. In some implementations, a transmission power of a transmission is scaled based on a priority rule and priorities of transmissions are determined based the message associated with the at least one transmission information. In some implementations, transmission powers of certain multiple uplink transmissions with a same priority are scaled in case that a sum of transmission powers of transmissions with higher priorities and the certain multiple uplink transmissions satisfies a predetermined condition.

In the implementations discussed above in relation to FIGS. 8 and 9, the power control parameter comprises at least one of a target receiving power value, a transmit power control (TPC) command, an index of a reference signal for pathloss measurement, a modulation and coding scheme, the number of the occupied physical resource, a channel format, or the bandwidth, and wherein the message further includes at least one of a determined transmission power, an indication of weights, a default factor, a factor indication, an indication of a transmission information, the measured value of pathloss associated with a PL-RS, a number of SRS resource ports, a number of antenna ports, UE capability value, a predefined value or an index of a predefined value set.

Figure 10:
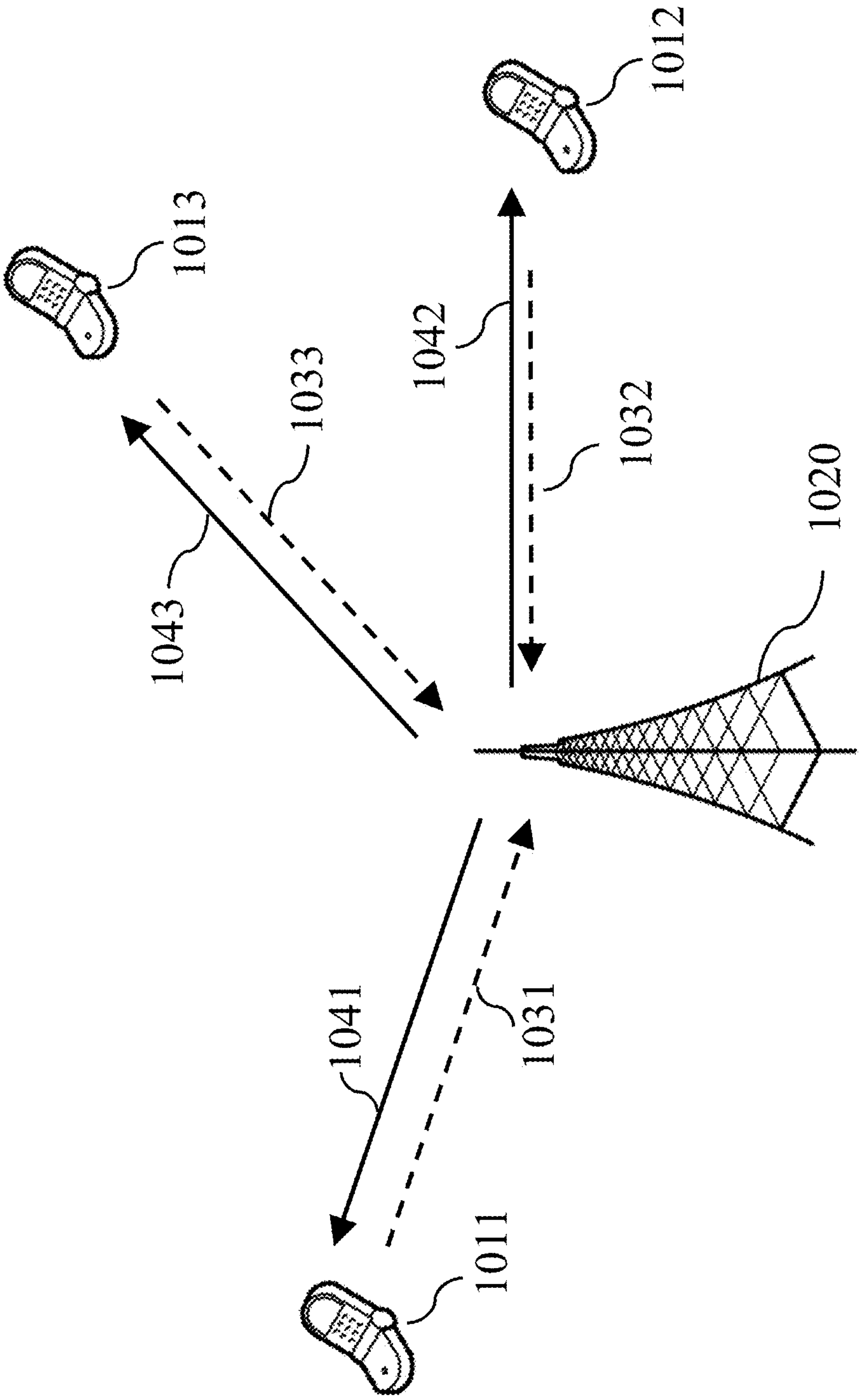
FIG. 10 shows an example of wireless communication including a base station (BS) and user equipment (UE) based on some implementations of the disclosed technology.

The implementations as discussed above will apply to a wireless communication. FIG. 10 shows an example of a wireless communication system (e.g., a 5G or NR cellular network) that includes a base station 1720 and one or more user equipment (UE) 1011, 1012 and 1013. In some embodiments, the UEs access the BS (e.g., the network) using implementations of the disclosed technology 1031, 1032, 1033, which then enables subsequent communication 1042, 1042, 1043) from the BS to the UEs. The UE may be, for example, a smartphone, a tablet, a mobile computer, a machine to machine (M2M) device, an Internet of Things (IoT) device, and so on.

Figure 11:
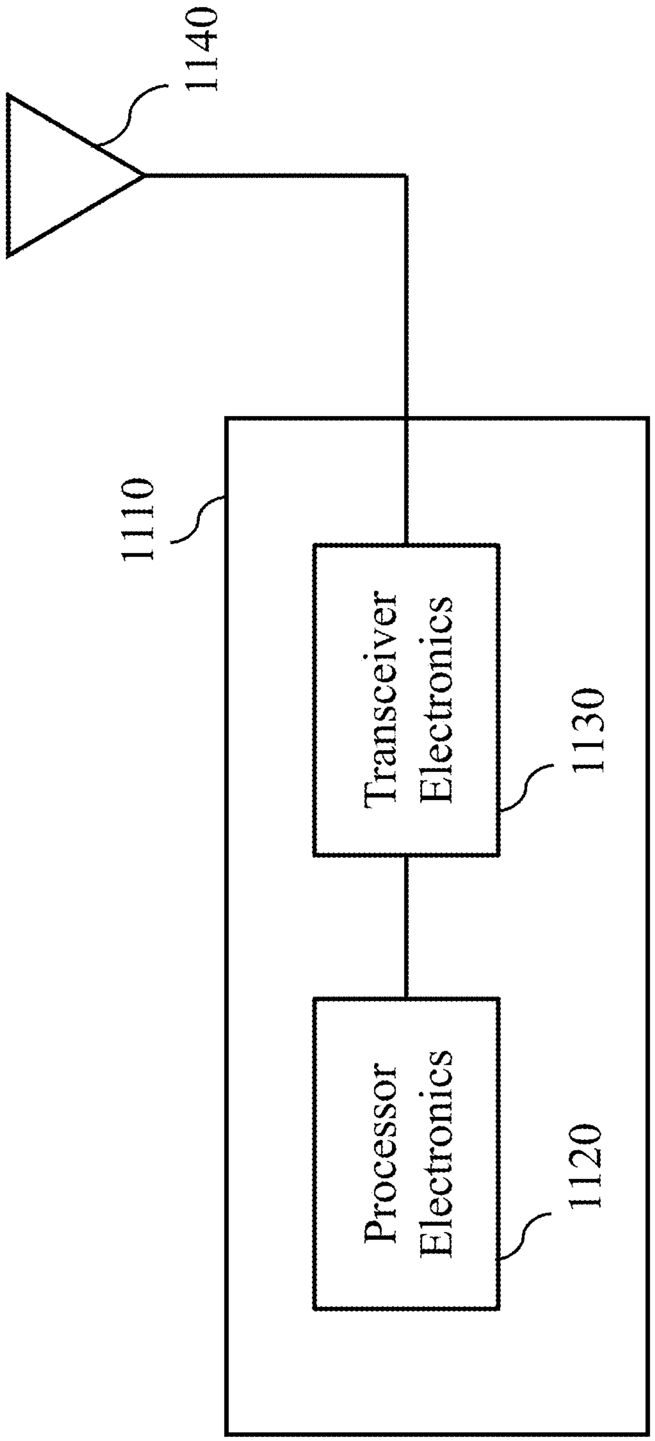
FIG. 11 shows an example of a block diagram of a portion of an apparatus based on some implementations of the disclosed technology.

FIG. 11 shows an example of a block diagram representation of a portion of an apparatus. An apparatus 1110 such as a base station or a user device which may be any wireless device (or UE) can include processor electronics 1120 such as a microprocessor that implements one or more of the techniques presented in this document. The apparatus 1110 can include transceiver electronics 1130 to send and/or receive wireless signals over one or more communication interfaces such as antenna 1840. The apparatus 1110 can include other communication interfaces for transmitting and receiving data. The apparatus 1110 can include one or more memories (not explicitly shown) configured to store information such as data and/or instructions. In some implementations, the processor electronics 1120 can include at least a portion of transceiver electronics 1130. In some embodiments, at least some of the disclosed techniques, modules or functions are implemented using the apparatus 1110.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

receiving, by a user device scheduled to simultaneously transmit uplink transmissions which are fully or partially overlapped in a time domain and associated with respective transmission information, a message indicating one or more sets of power control parameters associated with at least one transmission information from a network; and determining, based on the message, transmission power of the uplink transmissions, wherein the determining comprises:

limiting the transmission power of an uplink transmission to be not greater than a per-panel maximum output power associated with transmission information associated with the uplink transmission, wherein the per-panel maximum output power is specified based on at least one of a default factor, an indicated factor, a number of antenna ports, a UE capability value, a plurality of predefined value sets, or a plurality of predefined value tables; and determining at least one scaling factor to limit the transmission power of at least one of the uplink transmissions when total transmission power of the uplink transmissions exceeds a maximum output power in a transmission duration; and wherein the at least one scaling factor is determined to simultaneously scale the uplink transmissions having a same allocating priority and associated with different transmission information.

2. The method of claim 1, wherein the uplink transmission comprises at least one of a transmission occasion of an uplink signal, a repetition of an uplink signal, or an uplink signal comprising a physical uplink control channel (PUCCH), a physical uplink shared channel (PUSCH), a sounding reference signal (SRS), or a physical random access channel (PRACH), and wherein the transmission information comprises at least one of information grouping one or more reference signals, reference signal resource set, PUCCH resource set, panel related information, sub-array, antenna group, antenna port group, group of antenna ports, beam group, beam state, physical cell index (PCI), transmission reception point (TRP) related information, control resource set (CORESET) pool index, index of transmission configuration indication (TCI) state in a TCI state codepoint, UE capability value or UE capability set.

3. The method of claim 1, wherein the determining of the transmission power comprises determining respective transmission power for each uplink transmission.

4. The method of claim 3, further comprising at least one of:

determining the respective transmission power based on a plurality of power control parameters included in a set of the one or more sets of power control parameters, the set being associated with the respective transmission information.

5. The method of claim 1, wherein transmission powers of certain multiple uplink transmissions with the same allocating priority are scaled in case that a sum of transmission powers of uplink transmissions with higher priorities than the certain multiple uplink transmissions and the certain multiple uplink transmissions satisfy a predetermined condition.

6. The method of claim 5, wherein priorities of the uplink transmissions are determined based on the message associated with the at least one transmission information, or wherein the uplink transmissions carry a same uplink control information (UCI) type and are associated with different transmission information.

7. The method of claim 1, wherein a power control parameter comprises at least one of a target receiving power value, a transmit power control (TPC) command, an index of a reference signal for pathloss measurement, a modulation and coding scheme, a number of occupied physical resources, a channel format, or a bandwidth, and wherein the message further includes at least one of a determined transmission power, an indication of weights, a default factor, a factor indication, an indication of a transmission information, the measured value of pathloss associated with a path loss reference signal (PL-RS), a number of SRS resource ports, the number of antenna ports, UE capability value, a predefined value or an index of a predefined value set.

8. A method of wireless communication, comprising:

transmitting, by a network to a user device, a message including one or more sets of power control parameters associated with at least one transmission information from a network; and receiving, by the network from the user device, transmissions overlapping in time domain and associated with respective transmission information, the transmissions having transmission power that is determined and scaled based on the message associated with the at least one transmission information to have a value not greater than a maximum output power associated with the at least one transmission information, and wherein the transmission power of a transmission is limited to be not greater than a per-panel maximum output power associated with transmission information associated with the transmission, wherein the per-panel maximum output power is specified based on at least one of a default factor, an indicated factor, a number of antenna ports, a UE capability value, a plurality of predefined value sets, or a plurality of predefined value tables, wherein the transmission power of the transmission is scaled based on at least one scaling factor to limit the transmission power of at least one of the transmissions when total transmission power of the transmissions exceeds a maximum output power in a transmission duration, and wherein the at least one scaling factor is determined to simultaneously scale the transmissions having a same allocating priority and associated with different transmission information.

9. The method of claim 8, wherein transmission powers of certain multiple uplink transmissions with a same priority are scaled in case that a sum of transmission powers of transmissions with higher priorities and the certain multiple uplink transmissions satisfies a predetermined condition.

10. The method of claim 8, wherein the transmission comprises at least one of a transmission occasion of an uplink signal, a repetition of an uplink signal, or an uplink signal comprising a physical uplink control channel (PUCCH), a physical uplink shared channel (PUSCH), a sounding reference signal (SRS) or a physical random access channel (PRACH), and wherein the at least one transmission information comprises at least one of information grouping one or more reference signals, reference signal resource set, PUCCH resource set, panel related information, sub-array, antenna group, antenna port group, group of antenna ports, beam group, beam state, physical cell index (PCI), transmission reception point (TRP) related information, control resource set (CORESET) pool index, index of transmission configuration indication (TCI) state in a TCI state codepoint, UE capability value or UE capability set.

11. The method of claim 8, wherein the transmission power of the transmissions is determined as respective transmission power for each transmission.

12. A communication apparatus comprising processor electronics configured to implement a method comprising:

receiving, by a user device scheduled to simultaneously transmit uplink transmissions which are fully or partially overlapped in a time domain and associated with respective transmission information, a message indicating one or more sets of power control parameters associated with at least one transmission information from a network; and determining, based on the message, transmission power of the uplink transmissions, wherein the determining comprises:

limiting the transmission power of an uplink transmission to be not greater than a per-panel maximum output power associated with transmission information associated with the uplink transmission, wherein the per-panel maximum output power is specified based on at least one of a default factor, an indicated factor, a number of antenna ports, a UE capability value, a plurality of predefined value sets, or a plurality of predefined value tables; and determining at least one scaling factor to limit the transmission power of at least one of the uplink transmissions when total transmission power of the uplink transmissions exceeds a maximum output power in a transmission duration; and wherein the at least one scaling factor is determined to simultaneously scale the uplink transmissions having a same allocating priority and associated with different transmission information.

13. The communication apparatus of claim 12, wherein the determining of the transmission power comprises determining respective transmission power for each uplink transmission.

14. The communication apparatus of claim 12, wherein the uplink transmission comprises at least one of a transmission occasion of an uplink signal, a repetition of an uplink signal, or an uplink signal comprising a physical uplink control channel (PUCCH), a physical uplink shared channel (PUSCH), a sounding reference signal (SRS) or a physical random access channel (PRACH), and wherein the at least one transmission information comprises at least one of information grouping one or more reference signals, reference signal resource set, PUCCH resource set, panel related information, sub-array, antenna group, antenna port group, group of antenna ports, beam group, beam state, physical cell index (PCI), transmission reception point (TRP) related information, control resource set (CORESET) pool index, index of transmission configuration indication (TCI) state in a TCI state codepoint, UE capability value or UE capability set.

15. A communication apparatus comprising processor electronics configured to implement a method comprising:

transmitting, by a network to a user device, a message at least including one or more sets of power control parameters associated with at least one transmission information from a network; and receiving, by the network from the user device, transmissions overlapping in time domain and associated with respective transmission information, the transmissions having transmission power that is determined and scaled based on the message associated with the at least one transmission information to have a value not greater than a maximum output power associated with the at least one transmission information, and wherein the transmission power of a transmission is limited to be not greater than a per-panel maximum output power associated with transmission information associated with the transmission, wherein the per-panel maximum output power is specified based on at least one of a default factor, an indicated factor, a number of antenna ports, a UE capability value, a plurality of predefined value sets, or a plurality of predefined value tables, wherein the transmission power of the transmission is scaled based on at least one scaling factor to limit the transmission power of at least one of the transmissions when total transmission power of the transmissions exceeds a maximum output power in a transmission duration, and wherein the at least one scaling factor is determined to simultaneously scale the transmissions having a same allocating priority and associated with different transmission information.

16. The communication apparatus of claim 15, wherein the transmission comprises at least one of a transmission occasion of an uplink signal, a repetition of an uplink signal, or an uplink signal comprising a physical uplink control channel (PUCCH), a physical uplink shared channel (PUSCH), a sounding reference signal (SRS) or a physical random access channel (PRACH), and wherein the at least one transmission information comprises at least one of information grouping one or more reference signals, reference signal resource set, PUCCH resource set, panel related information, sub-array, antenna group, antenna port group, group of antenna ports, beam group, beam state, physical cell index (PCI), transmission reception point (TRP) related information, control resource set (CORESET) pool index, index of transmission configuration indication (TCI) state in a TCI state codepoint, UE capability value or UE capability set.

* * * * *